Aug. 14, 1928.
P. M. KRANTZ
1,680,998
ROUTE GUIDANCE
Filed Dec. 1, 1926     2 Sheets-Sheet 1
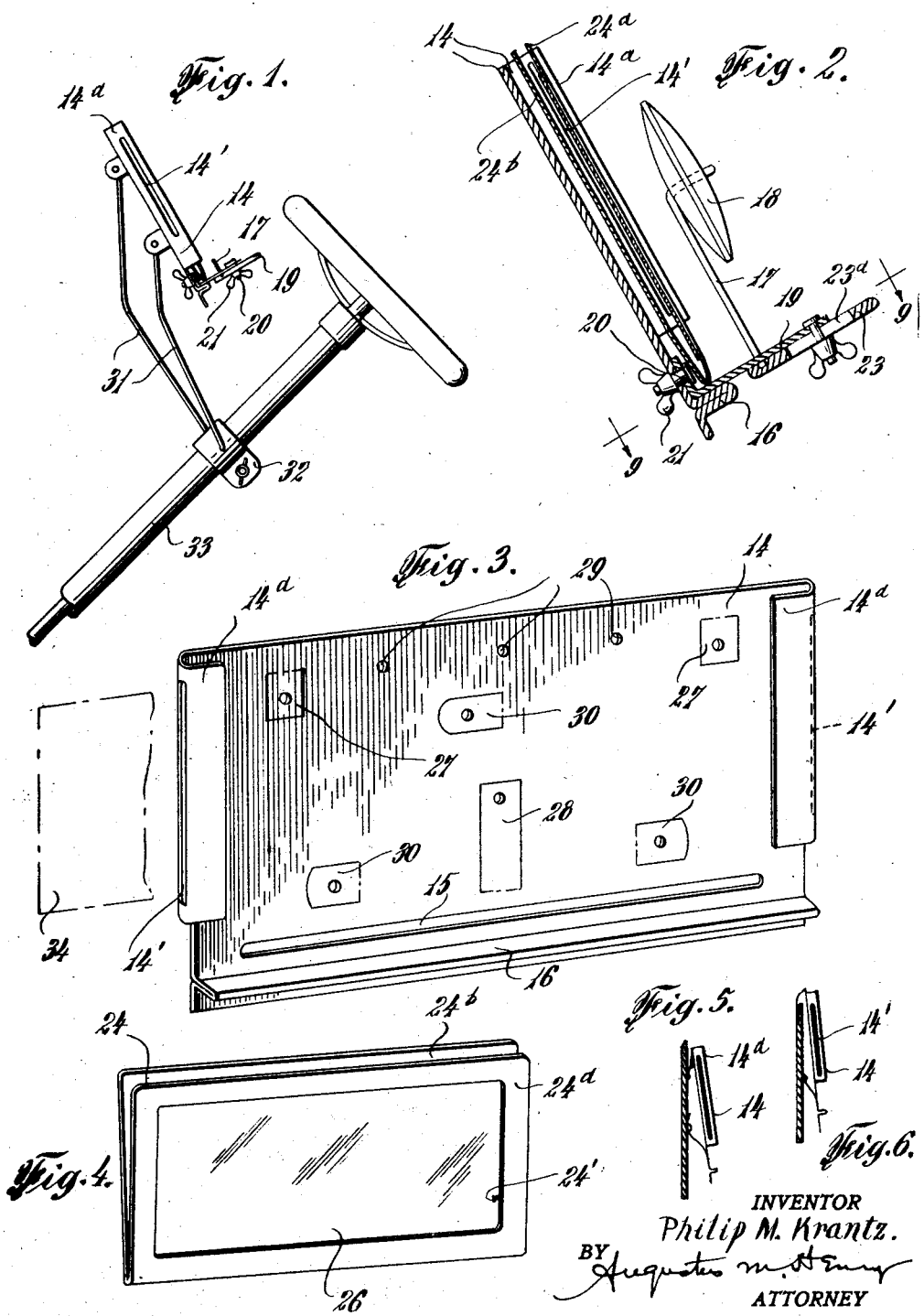
INVENTOR
Philip M. Krantz.
BY
ATTORNEY Aug. 14, 1928.
P. M. KRANTZ
1,680,998
ROUTE GUIDANCE
Filed Dec. 1, 1926   2 Sheets-Sheet 2
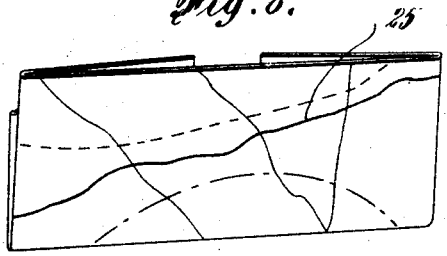
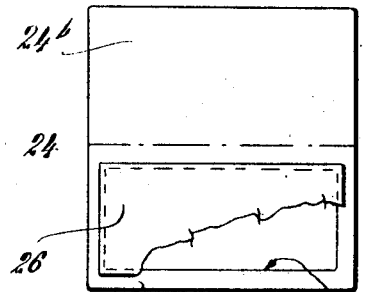
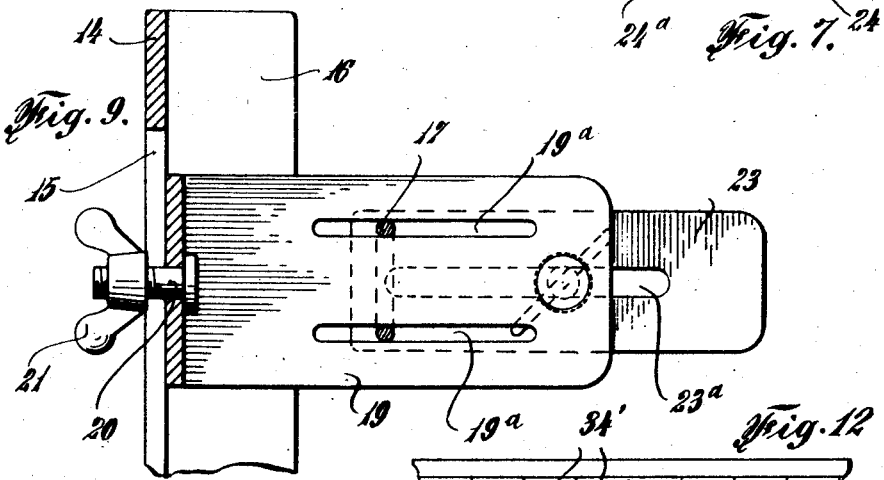
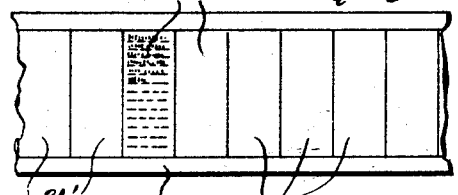
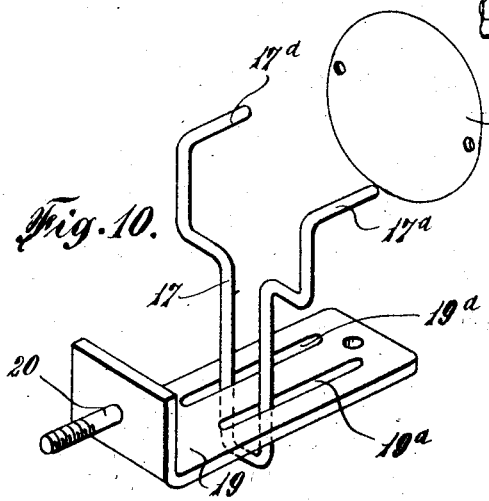
INVENTOR
Philip M. Krantz.
BY
ATTORNEY Patented Aug. 14, 1928.

1,680,998

UNITED STATES PATENT OFFICE.

PHILIP M. KRANTZ, OF BROOKLYN, NEW YORK.

ROUTE GUIDANCE.

Application filed December 1, 1926. Serial No. 151,852.

The subject of this invention, in one of the aspects of the latter, is a new article of manufacture, for use by an operator, pilot or driver of an airplane, automobile, or other conveyance; such article including the elements of a route-indicium carrier and an optical instrumentality, the latter for preferably adjustable interposition between the eye of such operator and the suitable support for said carrier,—this carrier being preferably a paper or other suitable comparatively limply flexible strip or sheet.

Adjustably mounted magnifiers have heretofore been proposed, as in U. S. Patent No. 1,345,272, for facilitating the reading of sometimes relatively illegible manuscript or other indicia continued observation of which with the naked eye may cause eye-strain or error of manipulation of associated appliances or device; but heretofore, so far as I am aware, no article of manufacture like that first-above referred to has been proposed.

Such new article of manufacture is capable, within the invention, of very many different utilizations; among which I may mention, of those now in mind particularly important for automotive or other road vehicles, (1) supporting and rendering easily readable say to an automobile tourist-driver, fairly long-distance and comparatively small-scale but large-size road-maps, without refolding or otherwise readjusting such a map throughout the trip over such a route-distance, and (2) supporting and rendering easily readable, to the driver of say a department store delivery vehicle, an easily handled single sheet or strip of fairly small size yet carrying as many names and addresses as the now employed bulky or numerous delivery or route sheet or sheets.

The present invention also provides, however, when viewed in perhaps a broader aspect, a support for a map, a delivery sheet, or an analogous record-member, of a new and improved type, and having one or more features of those satisfying the statements of certain objects of the invention, following:

(A) One of such objects is to provide a new and improved holder for a road-map so constructed and equipped that, even with a standard, large multi-folded map as now usually on sale, such holder may be carried continuously on the steering post or other part of the automobile so that the map can be readily seen at all times in order that the driver may constantly have before him a map of the road.

(B) Another such object is to provide a holder as just described, adapted also when desired for a special strip-record to be inspected from time to time by a vehicle pilot or driver, which record may be readjusted relative to the holder quickly and without necessity for unfolding and/or refolding the same; and yet a holder with which the optical instrumentality hereinabove referred to may be combined practicably, and in which, partially as the result of the immediately preceding statement and partially as the result of object (F) hereinbelow stated, unwind and take-up reels for the strip-record (as for instance proposed in U. S. Patent No. 1,476,256), or any such similar complex and costly equipment, may be avoided.

(C) Another of these objects is to provide a holder for route-indicia comprising wholly or chiefly one or a very few only of inexpensive sheet material elements each so designed that it may be manufactured from a minimum amount of material, and with a minimum wastage thereof; whereby to make any embodiment of the invention of really inconsequential expense.

(D) Another object is to provide such holder or one of the sheet material elements just referred to, with a plurality of integral or other inexpensive fitments selectively employable in various combinations for mounting the holder on various standard parts of an automobile or other air or land vehicle, and at various angles, or otherwise variously on such a selected part.

(E) Another of such objects is to provide a holder for a map or other record sheet or strip, which holder, when supported for continuous inspection, incorporates means for protecting such record from rain, snow, dust, wind and the like, preferably by including a transparent protective sheet member also otherwise functionally valuable; such sheet member further, preferably, being one of the sheet material elements referred to under object (C) supra.

(F) Still another object of the invention, viewing the invention in still another aspect, is to provide a new article of manufacture, and a practical method of fabricating the same, which article shall constitute one of the operative components of a route-telltale apparatus according to the invention as already described. Such article, in a particularly useful embodiment thereof (as the fields of usefulness of the invention are now appraised), is a delivery or route strip for a delivery vehicle, say of a department store making many "stops" per "run."

Various other objects and advantages of the invention will be specifically pointed out or apparent hereinafter, in the course of a description of a preferred one of the various possible forms of the invention as shown in the accompanying drawing; it being understood, of course, that such form is merely illustrative of one combination and arrangement of parts calculated to attain the objects of the invention, pursuant to present preference, and hence the detailed description of such form now to be given is not to be taken as at all defining or limiting the invention itself. That is to say, the scope of protection contemplated is to be taken solely from the appended claims, interpreted as broadly as is consistent with the prior art, and with explanatory references to the specification only where a claim is ambiguous or to be impliedly limited beyond its express terms to avoid such art in order to save the validity of said claim.

In the accompanying drawing:

Fig. 1 shows such form, in side elevation, mounted at the desired angle on the steering column of say an automobile,—but with the optical interponent missing and the hanger for the latter only fragmentarily shown;

Fig. 2 is a transverse vertical section, on an enlarged scale, of the complete embodiment (including said interponent);

Fig. 3 is perspective view of a preferably sheet metal holder member,—a fragment of a co-operant strip record being indicated in dot-and-dash lines;

Fig. 4 is a perspective view of a preferably fibre-paper and glassine sheet material holder-member, which, in the illustrated embodiment, forms with the device of Fig. 3, a complete holder-structure for the map or other record;

Fig. 5 is a somewhat diagrammatic side elevation (showing only the part of the embodiment illustrated in Fig. 3), indicating another possible mounting than as in Fig. 1;

Fig. 6 is a view similar to Fig. 5, showing still another possible mounting;

Fig. 7 illustrates further the holder component shown in Fig. 4;

Fig. 8 shows a road map folded in such manner as to provide a map-pad carrying on a smooth obverse face the "trail" intended for say a day's "run," and having bounding edges such that said pad may be "filed" in the "folder" of Fig. 4 to locate the "trail" behind the "window" of the "folder."

Fig. 9 is a section, much enlarged, taken on line 9—9 of Fig. 2;

Fig. 10 shows, in perspective, the optical interponent, the hanger for the latter, and the slotted column for such hanger, according to the embodiment of Figs. 2 and 9;

Fig. 11 shows in perspective the hanger-clamp member also illustrated in Figs. 2 and 9; and Fig. 12 shows a photographically prepared route or delivery strip as one embodiment of the article of manufacture according to object (F) supra.

Similar reference characters refer to similar parts throughout the several views of the drawings.

In its at present preferred form, that is when constructed more or less pursuant to the illustrative but not deliminative details of the drawings, the holder of the present invention is constructed as follows,—it of course being particularly understood that mention or indication of sizes, dimensions, shapes and materials are not used other than in an illustrative sense:

For purposes of simplicity and brevity, the description now to be given will assume, for example, that the illustrated embodiment is mounted as in Fig. 1, for continuous inspection by the driver of an automobile, on a long trip, or on a tour.

The element 14, hereinafter sometimes called the frame, is made up of a substantially rectangular sheet, say of metal, stamped and shaped to include a slot 15 and a ledge 16, for the supporting, lateral sliding and securement of an adjustable hanger 17 for a magnifying-glass 18. An L-shaped piece or column 19 carries a bolt 20 the shank of which passes through slot 15 so that the column and glass can be moved along the slot as desired; whereupon a wing nut 21 may be tightened to secure the column 19 against shift. The glass 18, in the present case, is face drilled at opposite sides to take the upturned hook-ends 17ª of the bent-wire glass-hanger 17, which latter is movable up and down a pair of slots 19ª in column 19, to proper focus-position relative to the map-plane. Means for holding this last adjustment include an auxiliary bar-member 23 having a slot 23ª through which passes a bolt 24 set in column 19 and also having a transverse groove 23ᵇ within which the mid-length of the wire-hanger 17 is nested.

Frame 14 has side lips 14ª, and a folder 24 shown best in Fig. 4 is of such size that the same may be held on frame 14 and within lips 14ª as shown in Fig. 2.

The map shown in Fig. 8, folded as there shown to expose the "trail" 25 for say a day's driving, is set inside the folder to expand the front and back leaves 24ª and 24ᵇ of the latter as indicated in Fig. 2. The map-pad thus made will of course be of substantially the same outline as the back leaf 24ᵇ of the folder; and the obverse face of the pad, that shown in Fig. 8, will face outward through the window 24' cut in front leaf 24ª of the folder and through the celluloid, glassine or other transparent sheet 26 preferably present and preferably marginally adhesively secured to the "window-sash" portion of folder leaf 24ª.

Then the folder and map-pad are inserted in frame 14 as above-described; the lips 14ª frictionally clamping the side extensions of the "window-sash" of the folder 24.

Then the map-plane aforesaid will be established; so that the glass and its hanger 17 may be adjusted and clamped perpendicularly of said plane, and thereafter, at intervals during the day's run, the column 19 carrying the glass thus focused, may be slipped along ledge 16, without readjusting wing nut 21, to carry the glass parallelly of said plane—say for another hour's run at each such slip-adjustment.

The frame 14 or any equivalent may be suitably secured to or hung from or rested on any suitable support; as a permanent part of an automobile or airplane. For instance, two tongues 27 and a third tongue 28 may be struck from the frame material, and these tongues may have nail or screw holes therein as indicated. Then, as shown in Figs. 5 and 6, the frame 14 may, for instance, (1) be screwed to a dash board by using the holes in tongues 27, or even by using other holes as those indicated at 29, or (2) the frame may be screwed in place as just explained and the tongue 28 may be bent out as indicated in Fig. 4 and then screwed to the dash board to adjust the angle of the map-plane, or (3) the frame may be attached to a windshield or dashboard by using the tongues 27 as a hook-over means for the top edge of such dash-board, windshield or the like, said tongues 27 then being arranged as indicated in Fig. 5, or (4) the hook-over attachment last-mentioned may be used plus a use of the tongue 28 as above described to change the angle of the frame 14, or (5) the tongues 27 and 28 need not be used, but instead the three tongues 30 may be bent out as shown in Fig. 1, and three wire members, two of which are indicated at 31 in Fig. 1, may be secured to said tongues 30 at their upper ends, such members 31 being secured at their lower ends to a clamp collar 32 applied around the steering wheel column 33, these wire members of course, if used, being preferably flexible and so bendable to adjust the angle of frame 14.

The invention also has a very valuable adaptation, as hereinabove indicated, for handling delivery or route sheets on delivery vehicles, say as used in large cities, in a manner to overcome the previous troubles and nuisances of handling a lot of loose sheets or a very large and unmanageable single sheet. The adaptation of the invention now being considered is now believed to be most practical when advantage is taken of another feature of the invention, to wit, a method of economically and practically preparing a delivery sheet or strip of very small size, even though as a result of such small size sheet the names, addresses and other notations on the sheet may be so minute as not to be readable easily with the usual naked eye—because, then, particularly, the same structure provided for the automobile tourist, or long-distance automobilist, may be sold to the owners of such delivery vehicles, and thus sold to them at really very low cost, as the optical instrumentality would be of equal if not greater value to the driver of the delivery vehicle than to the automobilist just referred to.

According to this utilization of the invention, and a utilization having in mind the attainment of the low-cost advantage just mentioned, the structure already described need only be modified by forming the frame 14 to incorporate also a pair of side slots 14' at or near the roots of the lips 14ª; while, on the other hand, it is obvious that these side slots may just as well as not be incorporated in the structure as manufactured for and sold to the automobile tourist.

Referring now to Figs. 3 and 12, a new article of manufacture according to the invention, and for carrying the route or delivery indicia, is indicated at 24. The master strip or sheet, or a plurality of such sheets or strips, (not shown), is or are prepared, as by pen-writing or type-writing, at the traffic department of say the department store. A plurality of such master sheets is recommended, so that each may be prepared in a typewriting machine. These sheets will carry from top to bottom, in column formation, the names, addresses and other required notations as to delivery "stops". Then these master sheets will be pasted or otherwise secured in side by side relation, to a suitable backing; as indicated by the rectangular areas 34' of Fig. 12. Then a photographic and preferably a considerably reduced replica of the set-up just described will be made. Desirably, the replica will be so much reduced, that the width of the strip 34 will be, as indicated in Fig. 3, such as to permit the strip to be endwisely threaded through the slots 14' and between the front and rear leaves of the folder 24 in place on the frame 14, and thereafter fed endwisely through and between the elements last described, to bring one column 34' after another, as required, into the field of view of the glass 18. Such a mode of operation is recommended, because then the glass may be clamped say opposite the center of the frame 14, as well as in proper focus; and no readjustment will be required during covering of the entire delivery route. The utilization of the glass 18, of course, makes it unimportant that probably, to save expense, the entries in the various columns 34' will be practically illegible to the naked eye, as indicated in the case of one of the columns as shown in Fig. 12.

Inasmuch as many changes could be made in the above constructions, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. In a route guidance device, the combination of a carrier for an indicia sheet, and a holder for said carrier; said carrier including a transparent front sheet, and a second sheet, and these sheets being flexibly joined at their bottoms to constitute a rudimentary book between the sheets of which book an indicia sheet in the shape of a folded map may be placed to be held in the book by gravity when the book is arranged with such flexible jointure lowermost and substantially horizontal; and said holder including a sheet-like main structure carrying at its bottom a forwardly protruding element on which the lowermost portion of the book may rest by gravity, said holder also including elements at its sides for coacting with said main structure to seize the side edges of the book, to force the book sheets together and resiliently against the indicia sheet, thereby simultaneously to hold said indicia sheet frictionally within the book and to hold the book frictionally on said forwardly protruding element,—said side elements having portions for engaging the side edges of the book to hold the latter positively against shift laterally of said main structure.

2. In a route guidance device, a supporting means for an indicia sheet including a plate-like structure to act as a rigid backing, said device also including side lips providing opposed recesses at opposite sides of the backing and extending from near the top to near the bottom of the backing, said lips overlying elongate slots aligned so as to permit an elongate indicia sheet to be moved lengthwise through both slots to expose a selected longitudinal subdivision of said sheet in front of said backing between said lips.

3. In a route guidance device, a supporting means for an indicia sheet including a plate-like structure to act as a rigid backing, said device also including side lips providing opposed recesses at opposite sides of the backing and extending from near the top to near the bottom of the backing, and said device further including a forwardly extended ledge near the bottom of the backing; in combination with a magnifying glass, and means adjustably positioning said glass to act with maximum optical efficacy relative to a predetermined portion of an indicia sheet on said supporting means, said positioning means including partially said ledge.

PHILIP M. KRANTZ.